United States Patent [19]

Rogner et al.

[11] Patent Number: 5,311,604
[45] Date of Patent: May 10, 1994

[54] METHOD OF MANUFACTURING DEVICES FOR OPTICAL FIBER NETWORKS, AND DEVICES MANUFACTURED THEREBY

[75] Inventors: Arnd Rogner, Karlsruhe; Andreas Neyer, Iserlohn, both of Fed. Rep. of Germany

[73] Assignee: Microparts Gesellschaft fur Mikrostrukturtechnik mbH, Dortmund, Fed. Rep. of Germany

[21] Appl. No.: 27,984

[22] Filed: Mar. 8, 1993

[30] Foreign Application Priority Data

Mar. 7, 1992 [DE] Fed. Rep. of Germany ....... 4207207
May 27, 1992 [DE] Fed. Rep. of Germany ....... 4217526

[51] Int. Cl.$^5$ ................................................. G02B 6/12
[52] U.S. Cl. .......................................... 385/14; 385/46; 385/15; 264/1.4; 264/1.5; 264/2.5
[58] Field of Search ........................ 385/1, 2, 4, 8, 14, 385/15, 20, 21, 22, 46; 264/1.1, 1.4, 1.5, 2.5

[56] References Cited

U.S. PATENT DOCUMENTS 5,019,301 5/1991 Coden et al. ................ 264/1.5
5,109,448 4/1992 Coden et al. ................ 264/1.5 X

FOREIGN PATENT DOCUMENTS 0315874 5/1989 European Pat. Off. .
0451549 10/1991 European Pat. Off. .

Primary Examiner—John D. Lee
Assistant Examiner—Phan Thi Heartney
Attorney, Agent, or Firm—Oblon, Spivak, McClelland, Maier & Neustadt

[57] ABSTRACT

A method of manufacturing passive integrated optical devices from polymeric materials, the method comprising providing a step structure at each transition between a fiber alignment structure and the preform for the light waveguide structure, wherein both of these structures are produced simultaneously. Passive integrated optical devices having ridges or trenches with rectangular cross sections and manufactured to this method are also described.

19 Claims, 4 Drawing Sheets

METHOD OF MANUFACTURING DEVICES FOR OPTICAL FIBER NETWORKS, AND DEVICES MANUFACTURED THEREBY

BACKGROUND OF THE INVENTION

1. Field of the Invention

The invention relates to a method of manufacturing passive integrated optical devices form polymeric materials for optical fiber networks employing glass fibers or polymer fibers as transmission media, and further relates to devices and molded pieces manufactured according to the method. A "molded piece" as used herein will be understood to mean a plastic article manufactured from a polymeric material by means of a casting or molding operation. The functional device for optical fiber network (FONs) is comprised of such a molded piece along with optical fiber pigtails which are to be coupled, and, possibly, a cover plate.

The aim of the invention is to provide more economical means of manufacturing such devices without detrimentally affecting the usable characteristics of the device.

FONs are becoming continually more important in communications engineering. For communications in the long-distance range and medium-distance range, the transmission medium principally used is single mode fibers comprised of quartz. In the short-distance range and in sensor networks, multimode fibers comprised of quartz or polymeric material are principally used.

FONs are comprised of optical fibers, active components (senders and receivers), controllable components (e.g. switches and modulators), and passive components (e.g. branches, couplers, interferometer structures, wavelength multiplexers, and wavelength demultiplexers). The manufacture of these components has heretofore been costly.

2. Description of the Related Art

It is known to manufacture passive components comprising miniaturized components from geometrical optics, such as lenses, prisms, and mirrors (Lutzke, D., 1986, "Lichtwelienleitertechnik", pub. Pflaum-Verlag, Munich). This miniaturization is subject to limits, in practice.

In Eur. Pat. Appl. 0,366,110, the manufacture of couplers comprised of glass optical fibers is described. The protective sheathing is removed from the optical fibers and the fibers are positioned in proximity and may be twisted together. Under tension they are fused together at a certain temperature. With the use of suitable fibers, multimode or single mode fiber couplers can be manufactured. For a 1×N coupler with N>2, a plurality of 1×2 couplers are connected in a sequence. This consumes excessive space, and is costly.

Eur. Pat. Appl. 0 315,874 discloses optical couplers for polymer optical fibers wherein 2-1000 polymer optical fibers are oriented in the same direction and bundled together. The fibers may be twisted together over a certain longitudinal distance. A piece of heat-shrinkable plastic tube is pushed over the node. After the heat-shrinkable tube is heated, the fibers are in a state of being tightly bundled together or fused together. The node can be stretched.

In Eur. Pat. Appl. 0,290,329, the manufacture of integrated optical single mode waveguide structures is described. The principle of wave guiding on the substrate by means of a strip waveguide, and the lithographic manufacturing process, allow integration and simultaneous manufacture of diverse optical functions on a substrate. Coupling of optical fibers with integrated optical waveguides manufactured by the described method is costly in terms of resources and finances.

In Eur. Pat. Appl. 0,451,549, optical couplers comprised of polymers, for multimode polymer FONS, are described which couplers are manufactured by injection molding. The coupler element is solid and of a single unit construction, and may be coated with a polymer having a lower index of refraction than the coupler. In the manufacturing method a polymer melt is injected into an injection mold which is comprised of two or more mold elements. After the melt solidifies, the finished coupler element comprised of the junction region with the pigtails of the optical fibers is removed from the mold. According to another method, channels are formed in the surface of a plastic plate, by injection molding, and the optical fibers are inserted in said channels. The void space between the fiber pigtails is filled with castable resin. The injection mold is fabricated by machining or spark erosion, followed by polishing. The channels for the optical fibers have a square or round cross section, and a diameter or side length of 0.1-3 mm.

Eur. Pat. Appl. 0,324,492 discloses a coupler for optical fibers which coupler is comprised of a stepped base plate which bears, on two sides, a number of "trenches" for introducing the ends of the waveguiding means. In the middle part of the plate the coupling structures are produced by a photolithographic process which may involve a plurality of stages.

In Eur. Pat. Appl. 0,420,173 a method of manufacturing finned waveguide structures from polymeric materials is described wherein a metal mold is filled with a liquid material which is cured by the action of energetic radiation. The time consumed in this method is typically greater than with, e.g., injection molding methods.

The known methods are characterized by a relatively costly technology wherein the waveguide structures and the alignment structures for the optical fibers are produced in or on the substrate. Some of the known methods allow only manufacture in the form of a single unit structure, or require special machinery. Some of the couplers have relatively high transmission losses and/or are not mechanically robust. For coupling of optical fibers to an integrated optical switching circuit, heretofore no satisfactorily economical and time-stable solution has been discovered. Previously it was difficult to produce the required vertical and horizontal cavity structures in precise positions for alignment with the relatively small waveguide structures. Only components for multimode polymeric FONs could be successfully produced with the use of economical mold processes, under known technology. Heretofore there was no known suitable transition means between a fiber alignment structure and a waveguide structure for multimode glass optical fibers or single mode glass optical fibers, for adjusting for the differing diameters of fiber cores and cladding.

SUMMARY OF THE INVENTION

Accordingly the problem was presented of devising a simple and economical method of manufacturing passive integrated optical devices, including their junction locations with optical fibers, which devices are comprised of polymeric materials and have dimensions in the micron range.

This problem is solved according to the invention by a method the features of which are set forth in claims 1-8. The features of the passive integrated optical devices which are manufactured are set forth in claims 9-17.

According to the inventive method, passive integrated optical devices are manufactured from polymeric materials, which devices comprise at least one molded piece with preforms for the waveguide structures and alignment structures. The light waveguide in the case of the light waveguide structures is produced from the preforms for said structures by subsequent processing of said preforms. At least one optical fiber means is coupled to the device. The polymeric molded piece is provided with a "step" structure at each transition between a fiber alignment structure and the preform for the light waveguide structure, with both the alignment structure and the waveguide structure preform being produced simultaneously. The light waveguide means can be united with the device before, during, or after the conversion of the preforms into waveguide structures.

DESCRIPTION OF THE PREFERRED EMBODIMENTS

To manufacture the integrated optical device, first a polymeric molded piece is produced by molding, which piece contains both preforms for waveguide structures and
alignment structures for the optical fibers which are to be coupled.

As a rule the waveguide structure and the alignment structure have different cross sections, thereby necessitating a "stepped" structure.

A preferred method of manufacturing a stepped microstructure body by deep-etch X-ray lithography, production of a stepped metallic mold insert by electroforming, and molding of a microstructured molded piece from plastic material is described, e.g., in Ger. Pat. Appl. 4,142,001.

First, a stepped microstructure body is fabricated by deep-etch X-ray lithography, with the structure of said body coinciding with the structure of the polymeric molded piece which is to be produced as the starting element for the subsequent passive integrated optical device (which polymeric molded piece is hereinafter referred to as the "molded piece").

The resulting stepped microstructure body is copied by electroforming to produce a metallic mold insert. The structure of the mold insert is complementary to the structure of the previously produced stepped microstructure body, and also complementary to the structure of the molded piece which the mold insert is used to mold.

Figure 1:
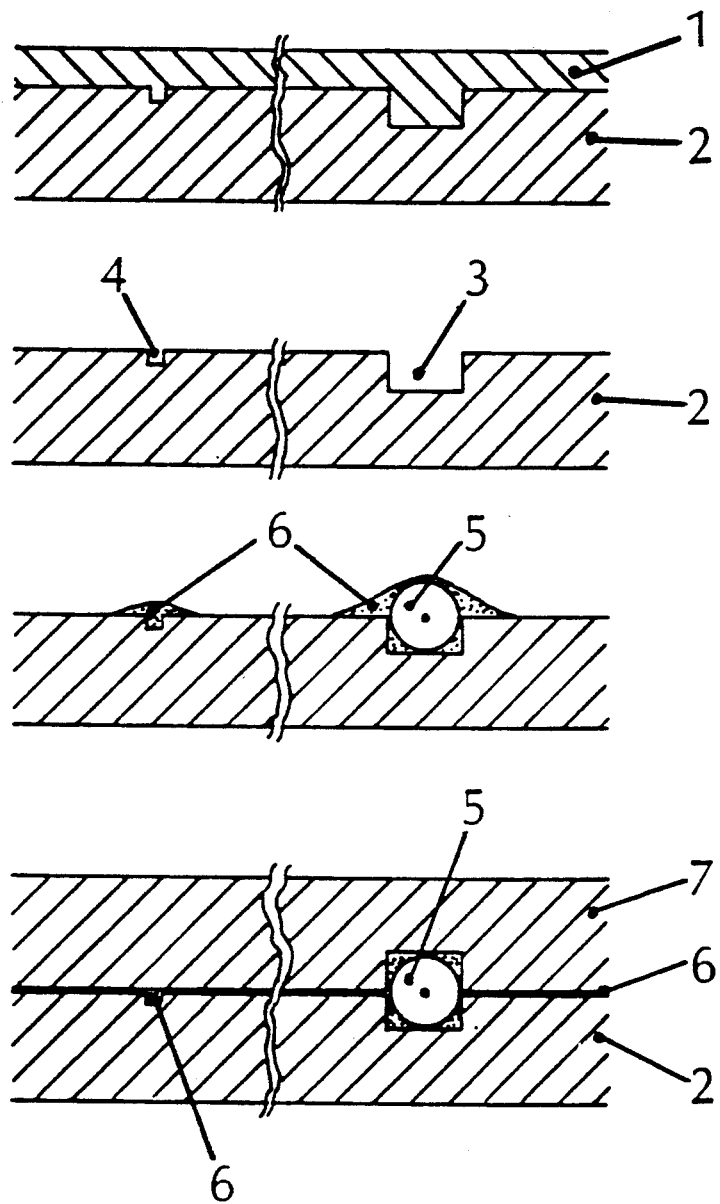
FIG. 1 is a schematic representation of a device having "trench" structures.

FIG. 1 illustrates the principal manufacturing method for a device with "trench" structures. The molded piece 2 produced by molding with the aid of the metallic mold insert 1 contains structures 3 for aligning the optical fibers which fibers are to be coupled,
pre-forms of waveguide structures 4, in the form of ridges or trenches, and
(possibly) additional microoptic elements the preforms of which have been produced in the previously produced stepped microstructure body by deep-etch X-ray lithography. Such microoptic elements are, e.g., prisms, cylindrical lenses, cylindrical mirrors, and line gratings with various line configurations.

The ridges or trenches for light waveguide purposes have a rectangular cross section with sides of 1-1000 micron.

The optical fibers to be coupled are comprised of quartz glass or plastic material, and have a core and cladding, wherewith the index of refraction of the core material is greater than that of the cladding material. The diameter of the fiber core is 1-980 micron; the outer diameter of the cladding is 30-1000 micron. The trenches for aligning the optical fibers inside the molded piece have a rectangular cross section the edges of which are adjusted to match the diameter of the optical fibers. These trenches are offset transversely to the trench axis, with respect to the structures for waveguiding, in a "step" structure, in at least one of the two directions. In this way the lightguiding core of the optical fibers is disposed exactly in front of the end face of the waveguide structure in the molded part. At the same time, an axial detent for the exact positioning of the light waveguiding means in the axial direction is provided.

The molded piece has at least one trench for coupling of at least one optical fiber. In general the molded piece has a plurality of trenches each of which accommodates one optical fiber. The waveguide structures for lightguiding within the molded piece are disposed in the molded piece between the pigtails of the optical fibers. These structures may have a variety of configurations in the direction of the waveguiding, giving rise to a variety of devices, e.g. T-, Y-, X-, M-, and N couplers, m x n couplers (with m, n being the same or different and each having a value from 1 up to a relatively large value), directional coupler structures, wavelength multiplexers, and wavelength demultiplexers. Such structures may be multiply present in a single device, and may be present separately or in hybrids, e.g. as a plurality of sequentially disposed 1×2 couplers. The structures may be symmetric, where an incoming light wave is to be distributed uniformly, or asymmetric, where the division ratio is to be other than 1. The structures may be straight, to achieve an optimal, minimum-attenuation light transmission, or may be curved ad libitum.

As materials for the molded piece molded with the aid of the metallic mold insert, polymers are used which are transparent to the wavelength of light which is to be utilized. Such materials are, e.g., polymethyl methacrylate, polycarbonate, polyurethane, polystyrene, and polyolefin. The molding technique used may be, e.g., injection molding, injection stamping, reaction molding, vacuum molding, stamping, vacuum stamping, pressing, or injection pressing.

The molded pieces are further processed as follows (see FIG. 1). For molded pieces with trench structures 4, the pigtails of the optical fibers 5 to be coupled are inserted into the aligning trenches 3 of the molded piece 2. To produce a waveguide, a polymer 6 in flowable form is poured into the trench structures 4 and the aligning trenches 3; wherewith the index of refraction of polymer 6 is greater than that of the polymer of which the molded piece 2 is comprised, so that the numerical aperture of the waveguide structure is adjusted to the numerical aperture of the optical fibers, or in the case of single mode waveguides the mode fields of the optical fibers are maximally mutually adjusted to the mode field of the waveguide structure. A cover plate 7 is applied to the molded piece 2; the curing flowable polymer 6 which has been poured in adhesively bonds the plate 7 to the molded piece 2. The coupled optical fibers 5 are strongly and durably bonded to the molded piece. Liquid transparent prepolymers which can be cured by light, heat, or chemical initiation are suitable as materials for producing the waveguide structures; such materials are, e.g., epoxide resins or acrylate-based prepolymers.

In the case of molded pieces with ridge structures for single mode optical fibers, the index of refraction of the ridge is increased by implantation of ions of a specific energy and dose. In this way the spatial region in which the light waves are guided is bounded with respect to the remainder of the molded piece. The optical fibers to be coupled may be adhesively bonded to the molded piece in the alignment trenches. In this case, the cover plate may be optionally omitted.

In the case of molded pieces with ridge structures for multimode optical fibers, the ridges are embedded in a material having an index of refraction smaller than the index of refraction of the polymer of which the molded piece is comprised, so that the numerical aperture of the waveguide structure is matched to the numerical aperture of the optical fibers. In this case also, the cover plate may be optionally omitted.

The alignment trenches for the optical fibers may have part of their cross section in the cover plate.

The inventive method and the devices manufactured thereby have the following advantages:

The production of molded pieces with a transition comprising a "step" structure in one or both of the two transverse directions, between the alignment trenches for the optical fibers and the waveguide structure, is a prerequisite for manufacturing single mode devices, and in the case of multimode devices it minimizes the light losses caused by the difference in diameter of the core of the waveguiding means and the cladding of the waveguiding means at the transition from the waveguide structure to the optical fiber;

The relatively small structures, in the range of a few microns, needed for waveguiding of light, and the relatively large structures, in the range of a few hundred microns, needed for the alignment of optical fibers, are produced simultaneously and in the same manner in all stages of the process;

The stepped microstructure bodies produced by deep-etch lithography have high dimensional accuracy, and therefore the metallic mold insert and the molded pieces have also high dimensional accuracy;

The depth of "immersion" of the optical fibers can be precisely specified in advance, due to the transition embodying a "step" structure. In this way the symmetry (or purposeful asymmetry) of the device is improved;

The method of manufacturing the stepped microstructure body is relatively unsusceptible to errors, and the proportion of rejects among the metal mold inserts is small;

The vertical wall surfaces of the metal mold insert which play a part in the molding of the molded pieces are derived from surfaces produced by deep-etch lithography; their original roughness-height is very small and substantially smaller than the original roughness which can be achieved by mechanical precision machining and/or polishing. Therefore losses due to light dispersion at wall surfaces are minimized;

One device may incorporate a variety of (possibly complex) functions. The integration density may be quite high, wherewith costs are favorable;

The coupling of the optical fibers to the molded piece is very stable over a long term;

The cured polymer at the end face of the optical fiber reduces losses due to light reflection at the transition from the optical fiber to the waveguide structure, in comparison to a transition from the optical fiber to air;

The dimensions of the waveguide structures in the molded piece which dimensions are on the order of microns may be chosen optimally with high precision (precision in the submicron range);

The favorable properties of numerous polymer materials may be better utilized in a method comprising molding of molded pieces than with prior known methods;

The time required to manufacture the molded piece is less when injection molding is used than, e.g., when UV-curing materials are used;

The metal mold insert may be used to produce numerous molded pieces.

Figure 2:
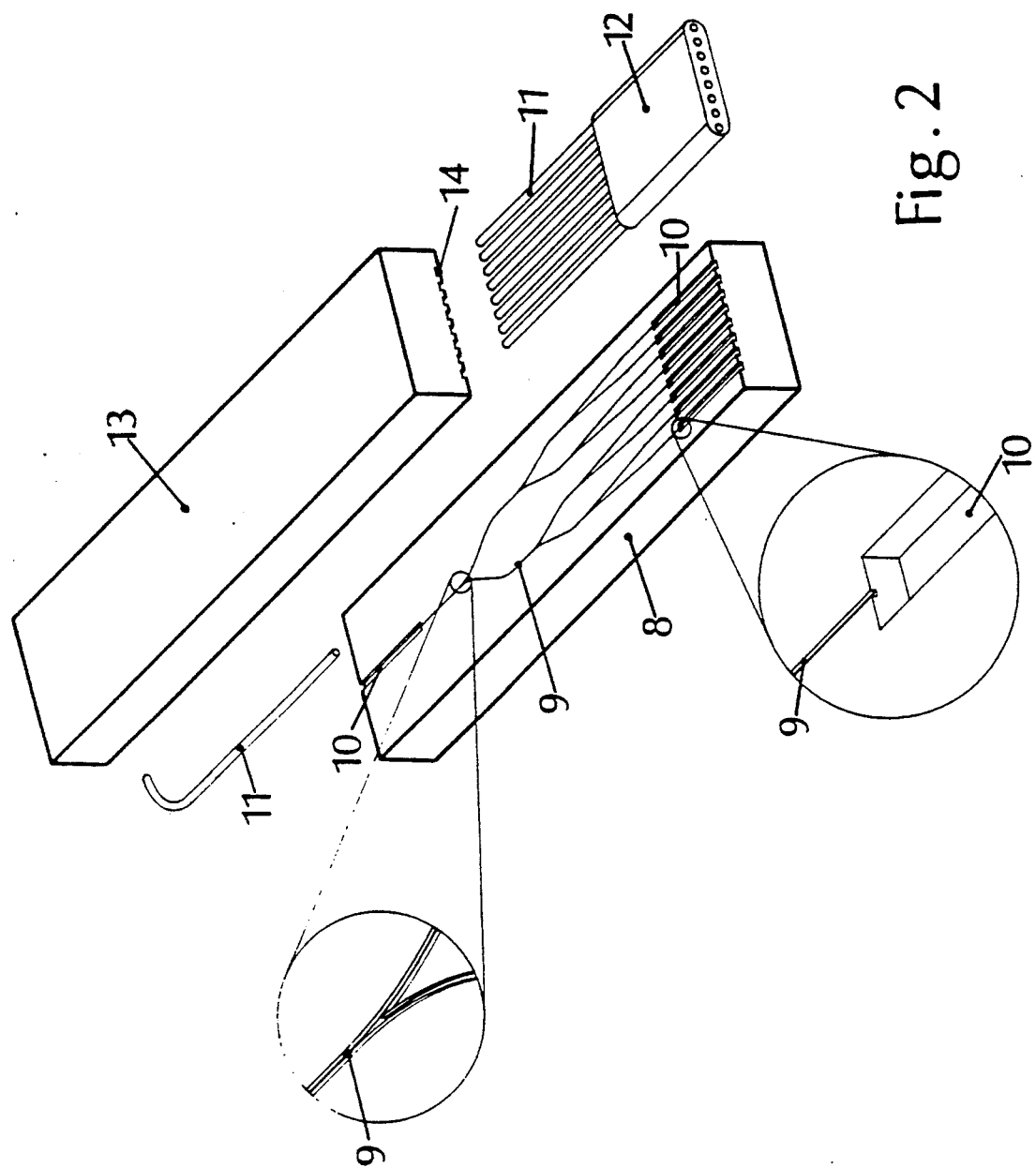
FIG. 2 is a 1×8 coupler with trench structures for single mode optical fibers.
Figure 3:
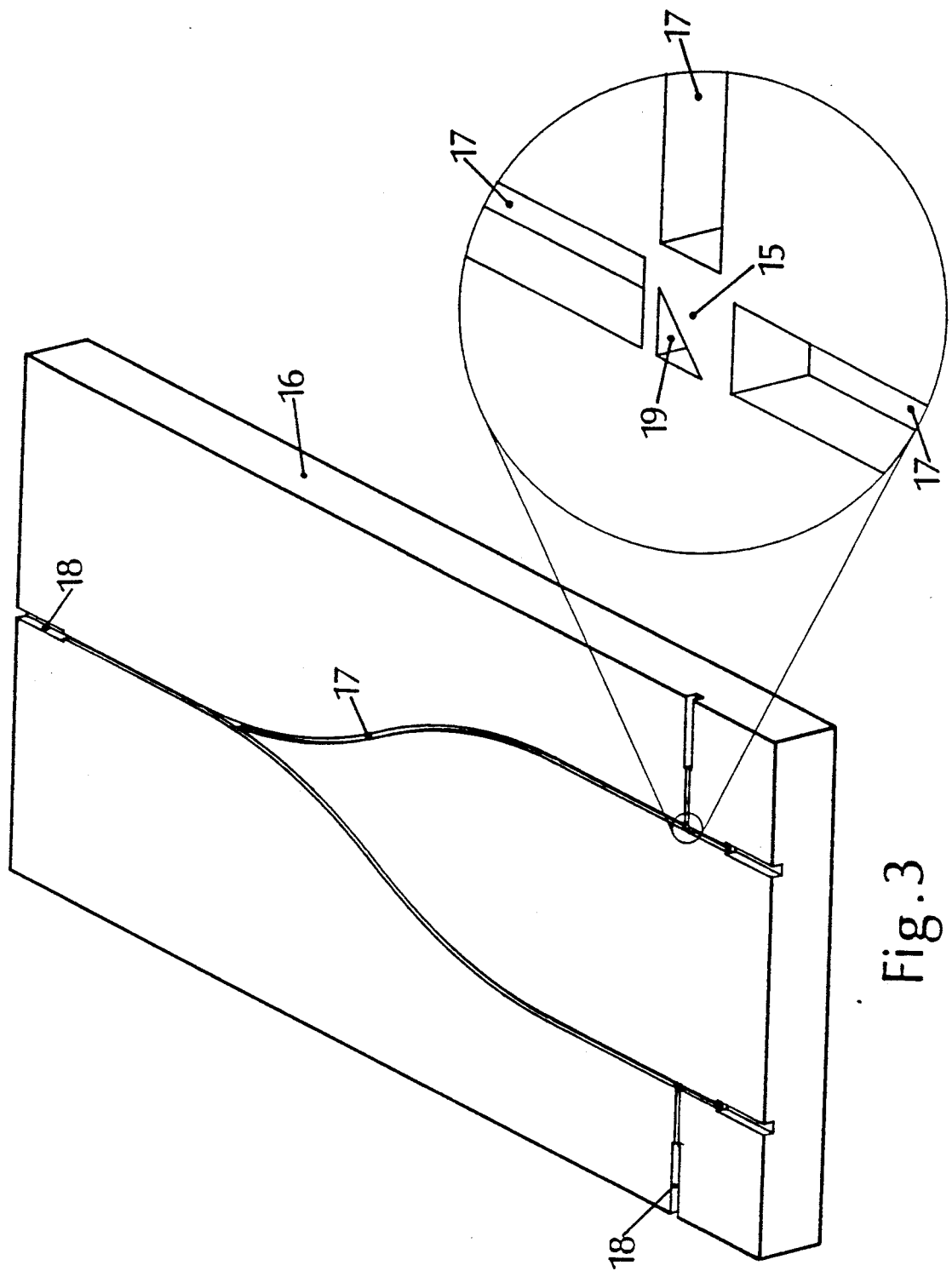
FIG. 3 is a 1×2 coupler (Y-coupler) with beam divider prism and trench structures for multimode optical fibers.
Figure 4:
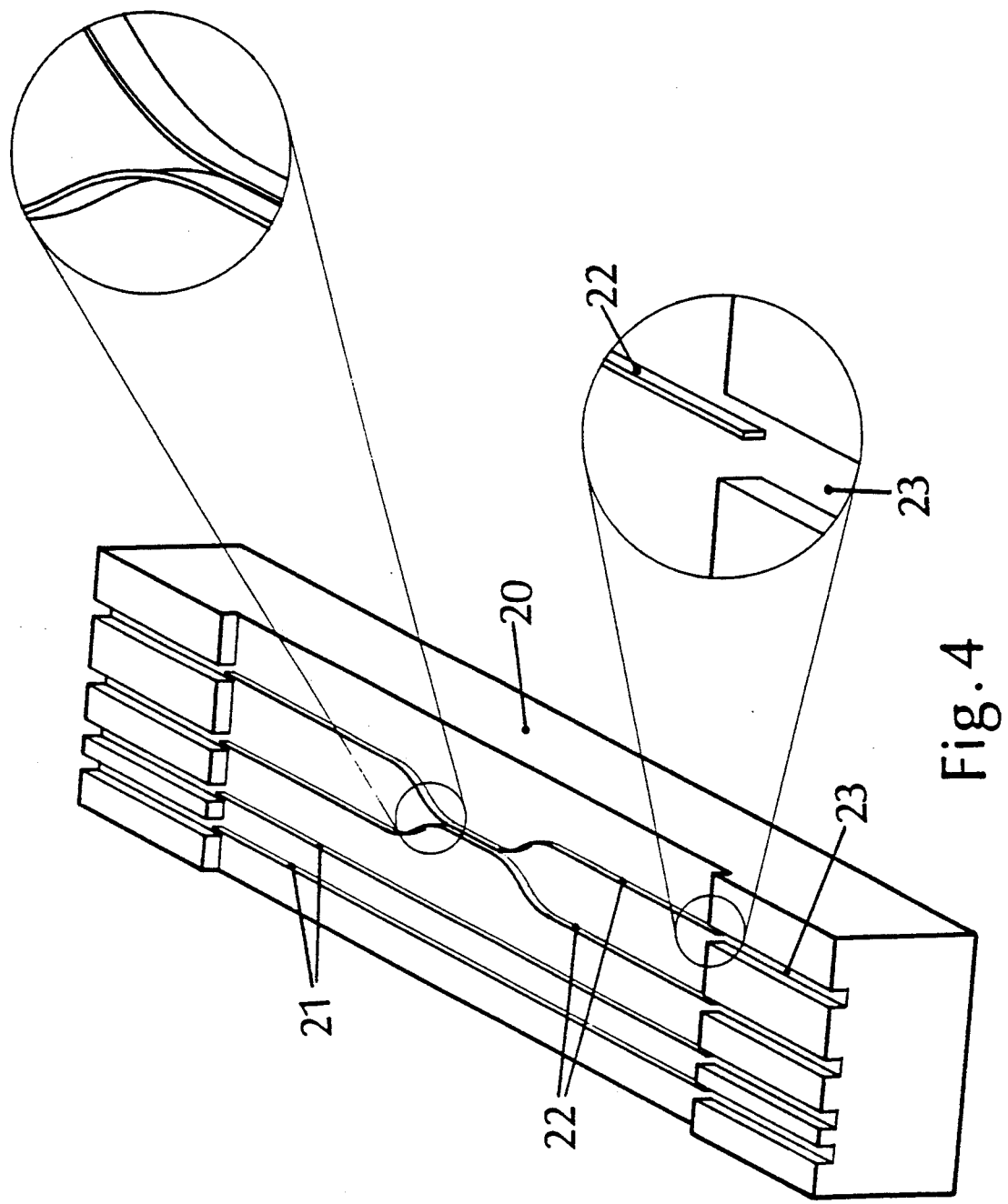
FIG. 4 is a 2×2 directional coupler with ridge structures, for single mode optical fibers.

The invention is further illustrated in Examples 1-3 and FIGS. 2-4.

EXAMPLE 1 AND FIG. 2: ×8 COUPLER WITH TRENCH STRUCTURES FOR SINGLE MODE OPTICAL FIBERS

A metal mold insert was produced by electroforming, using a microstructure body fabricated by deep-etch X-ray lithography, and said mold insert was used to mold a molded piece 8 comprised of polymethyl methacrylate (PMMA, index of refraction 1.490). Piece 8 contained trenches 9 in a repeated Y-configuration (width of trench 9 micron, depth 7 micron), as preforms for the waveguide structures, and further contained alignment trenches 10 (depth 66 micron, width 125 micron, length 5 mm) for the optical fibers 11 which were to be coupled.

A cladded quartz optical fiber (fiber diameter 125 micron, core diameter 9 micron, index of refraction of the quartz core=1.49) was inserted in each of the nine alignment trenches 10. The planar end of each said fiber was disposed at the "step" structure between the alignment trench 10 and the trench 9 for the light waveguide. For simplified coupling, a multifiber ribbon 12 having 8 fibers in a parallel array of width 250 micron may be used. A copolymer comprised of deuterated PMMA-d8 and tetrafluoropropyl methacrylate (TFPMA) was poured into the trenches 9 for the light waveguides and the alignment trenches 10 with the optical fibers 11 preinserted in said trenches 10. The mixing ratio was adjusted such that the difference between the index of refraction and that of the molded piece 8 was 0.005.

The molded piece was immediately covered with a plate 13 comprised of PMMA. The copolymer, as it cured, adhesively bonded the plate 13 to the molded piece 8, and durably bonded the coupled optical fibers 11 to the molded piece.

Because the upper side of the optical fibers 11 extended beyond the upper side of the molded piece, the cover plate 13 also had alignment trenches 14 in its ends, for the optical fibers. These trenches were 59 micron deep, 125 micron wide, and 5 mm long.

The single mode waveguide structure produced had attenuation 0.8 db/cm at wavelength 1300 nm.

EXAMPLE 2 AND FIG. 3: 1×2 COUPLER (Y-COUPLER) WITH BEAM DIVIDER PRISM AND TRENCH STRUCTURES FOR MULTIMODE OPTICAL FIBERS

In this device for sensor applications, the light from the light source was divided in the Y into two branches and then passed through a prism structure 15 to be passed over an optical measuring fiber to an experimental apparatus. The prism structure did not influence this beam in an appreciable way. The part of the beam reflected by the experimental apparatus was directed by the prism by total reflection to a second optical fiber which was connected to a detector.

For the manufacture, analogously to Example 1 a molded piece 16 was molded from PMMA material. The molded piece contained Y-configured trenches 17 (width 200 micron, depth 200 micron) as preforms for the waveguide structures, and alignment trenches 18 (width 250 micron, depth 225 micron, length 3 mm) for the optical fibers to be coupled.

In each of the five alignment trenches a multimode stepped-index optical fiber (fiber diameter 250 micron, core diameter 200 micron, index of refraction of the core=1.49, numerical aperture 0.5) was inserted, with the planar end of the fiber being disposed at the "step" between the alignment trench for the optical fiber and the trench for the light waveguide. An epoxide resin (EPO-TEK 301-2, index of refraction=1.564) was poured into the trenches 17 for the light waveguides and into the alignment trenches 18 with the optical fibers preinserted in said trenches 18. The opening 19 behind the reflecting prism was left empty. The molded piece was immediately covered with a plate comprised of PMMA material. The curing epoxide resin adhesively bonded the plate to the molded piece, and durably bonded the coupled optical fibers to the molded piece.

The insertion attenuation of the approximately 3 cm long device was 9.1 dB and 9.4 dB, respectively, in the two symmetrical measuring outputs (at wavelength 633 nm). Thus the attenuation difference was only 0.3 dB. Assuming zero-loss reflection at the pigtails of the optical measuring fibers, the insertion attenuation at the two detector outputs was 12.3 dB and 12.7 dB, respectively.

EXAMPLE 3 AND FIG. 4: 2×2 DIRECTIONAL COUPLER WITH RIDGE STRUCTURES, FOR SINGLE MODE OPTICAL FIBERS

Analogously to the preceding Examples, a molded piece 20 was fabricated from PMMA material. In addition to two unbranched ridges 21, the molded piece contained additional ridges 22 in a directional coupler arrangement (width 5 micron, height 64 micron) for the light waveguides, and alignment trenches 23 (width 125 micron, height 120 micron, length 10 mm) for the optical fibers to be coupled.

The molded piece was subjected to an ion beam over its entire surface in the region of the ridges 21 and 22, wherewith the index of refraction in the irradiated regions was elevated, in the neighborhood of (and at) the surface (1988, "Micro-optics", SPIE Vol. 1014, pp. 132-136).

A single-mode optical fiber (dimensions as in Example 1) was inserted in each of the eight alignment trenches 23, with the planar end of the fiber being disposed at the "step" structure between the alignment trench and the light waveguide ridge. PMMA was poured over the molded piece in the region around the ridges and in the alignment trenches, to protect the optical fibers and the waveguide structure.

What is claimed as new and desired to be secured by letters patent of the United States is:

1. A process of manufacturing passive integrated optical devices from polymeric materials, which devices are comprised of at least one molded piece with preforms for a plurality of light waveguide structures and optical fiber alignment structures, wherein the light waveguide in the case of the light waveguide structures is produced from the preforms for said structures by subsequent processing of said preforms, and the subject devices are further comprised of at least one coupled optical fiber;

comprising production of the polymer molded piece which is provided with a step structure at each transition between a fiber alignment structure and the preform for the light waveguide structure, wherein both of these structures are produced simultaneously.

2. The process according to claim 1, further comprising production of a stepped microstructure body by deep-etch X-ray lithography, wherewith the structure of said body coincides with the structure of the molded piece and contains both preforms for the light waveguide structures and preforms for aligning the optical fibers which are to be coupled;

production of a stepped metallic mold insert from the stepped microstructure body, by electroforming, wherewith the structure of said insert is complementary to the structure of the molded piece;

molding of a molded piece from plastic material, by means of the stepped metallic mold insert, which plastic molded piece has a stepped microstructure, and contains structures or preforms of structures for the light waveguide as well as alignment trenches for the optical fibers which are to be coupled.

3. The process according to claim 1, further comprising molding of a molded piece from plastic material, by means of a stepped metallic mold insert, which plastic molded piece has a stepped microstructure, and contains is structures for the light waveguide which structures are in the form of ridges or trenches, and further may contain additional microoptic elements, such as prisms, cylindrical lenses, cylindrical mirrors, or line gratings.

4. The process according to claim 1, further comprising molding of the light waveguide structure in the form of trenches wherewith in the further course of the manufacturing process said trenches are completely or in parts filled with a polymer having an index of refraction greater than the index of refraction of the polymer of which the molded piece is comprised.

5. A method according to claim 4, further comprising coupling of the optical fibers to the integrated optical waveguide structures by insertion of the fibers into the fiber alignment structures, wherewith the fibers are fixed in position by the material with which the trench structures are filled.

6. The process according to claim 1, further comprising molding of the waveguide structure in the form of ridges, and increasing the index of refraction of the ridges for the light waveguide in the molded piece by means of ion implantation.

7. The process according to claim 1, further comprising application of a cover plate comprised of a material having an index of refraction which is lower than the index of refraction of the waveguide structure, which cover plate serves as a top cover and seal of the molded piece.

8. The process according to claim 7, further comprising coupling of the optical fibers to the integrated optical waveguide structures by insertion of the fibers into the fiber alignment structures, wherewith the cover plate extends over the depressions for the fiber alignment structures and presses the fibers into said depressions.

9. Passive integrated optical devices comprises of polymeric materials, including ridges or trenches for the light waveguide, which ridges or trenches have rectangular cross sections wherein the lengths of the edges of the rectangles are 1–1000 micron, further comprised of at least one molded piece with preforms for a plurality of light waveguide structures and optical fiber alignment structures, wherein the light waveguide in the case of the light waveguide structures is produced from the preforms for said structures by subsequent processing of said preforms, and the subject devices are further comprised of at least one coupled optical fiber; made by a process comprising production of the polymer molded piece which
is provided with a step structure at each transition between a fiber alignment structure and the preform for the light waveguide structure, wherein both of these structures are produced simultaneously.

10. Passive integrated optical devices comprised of polymeric materials according to claim 9, wherein the ridges or trenches for the light waveguide progress in a straight or curved configuration.

11. Passive integrated optical devices comprised of polymeric materials according to claim 9, wherein the ridges or trenches for the light waveguide have widths which change within the device, with progression in a direction parallel to the surface.

12. Passive integrated optical devices comprised of polymeric materials according to claim 9, further comprising alignment trenches for the coupled light waveguide means which waveguide means have diameters 30–1000 micron, wherein the waveguide means has a step structure in at least one of the two directions perpendicular to the trench axis, between the alignment trench and the structure for the light waveguide.

13. Passive integrated optical devices comprised of polymeric materials according to claim 9, further comprising ridges or trenches for the light waveguide, and microoptic elements selected from the group consisting of prisms, cylindrical lenses, cylindrical mirrors, and line gratings.

14. Passive integrated optical devices comprised of polymeric materials according to claim 9, further comprising ridges or trenches which form a 1×n coupler (branch coupler), where n is from 2 to 100.

15. Passive integrated optical devices comprised of polymeric materials according to claim 9, further comprising ridges or trenches which form an n×m star coupler, where n,m independently equal from 1 to 100.

16. Passive integrated optical devices comprised of polymeric materials according to claim 9, further comprising ridges or trenches which form a symmetric or asymmetric T-coupler or Y-coupler.

17. Passive integrated optical devices comprised of polymeric materials according to claim 9, further comprising ridges or trenches which form a wavelength demultiplexer in a directional coupler structure.

18. Passive integrated optical devices comprised of polymeric materials according to claim 9, further comprising ridges or trenches which form a 1×n coupler (branch coupler), where n from 2 to 32.

19. Passive integrated optical devices comprised of polymeric materials according to claim 9, further comprising ridges or trenches which form an n×m star coupler, where n and m, independent of each other, equal from 1 to 32.

* * * * *